US008862252B2

(12) United States Patent
Rottler et al.

(10) Patent No.: US 8,862,252 B2
(45) Date of Patent: Oct. 14, 2014

(54) AUDIO USER INTERFACE FOR DISPLAYLESS ELECTRONIC DEVICE

(75) Inventors: Benjamin Rottler, San Francisco, CA (US); Matthew Rogers, Sunnyvale, CA (US); Bryan J. James, Menlo Park, CA (US); Policarpo Wood, San Francisco, CA (US); Timothy Hannon, Campbell, CA (US)

(73) Assignee: Apple Inc., Cupertino, CA (US)

( * ) Notice: Subject to any disclaimer, the term of this patent is extended or adjusted under 35 U.S.C. 154(b) by 794 days.

(21) Appl. No.: 12/363,513

(22) Filed: Jan. 30, 2009

(65) Prior Publication Data
US 2010/0198375 A1  Aug. 5, 2010

(51) Int. Cl.
| | |
|---|---|
| *G06F 17/00* | (2006.01) |
| *G06F 3/0482* | (2013.01) |
| *G11B 27/10* | (2006.01) |
| *G11B 27/34* | (2006.01) |
| *G06F 3/0488* | (2013.01) |
| *G06F 3/0489* | (2013.01) |

(52) U.S. Cl.
CPC .............. *G11B 27/34* (2013.01); *G06F 3/0482* (2013.01); *G11B 27/105* (2013.01); *G06F 3/04883* (2013.01); *G06F 3/0489* (2013.01)
USPC .......................................................... 700/91

(58) Field of Classification Search
CPC ....... G06F 3/16; G06F 3/0481; G06F 3/0482; G06F 3/167; G11B 24/30749; G10H 2240/091
USPC .................................... 700/94; 715/727–729
See application file for complete search history.

(56) References Cited

U.S. PATENT DOCUMENTS 3,704,345 A    11/1972  Coker et al.
3,828,132 A     8/1974  Flanagan et al.
(Continued)

FOREIGN PATENT DOCUMENTS

| CH | 681573 A5 | 4/1993 |
|---|---|---|
| DE | 3837590 A1 | 5/1990 |

(Continued)

OTHER PUBLICATIONS

Kane, Shaun K., "Slide Rule: Making Mobile Touch Screens Accessible to Blind People Using Multi-Touch Interaction Techniques"Assets '08 Oct. 13-15, 2008, XP002576187, http://students.washington.edu/skane/pubs/assets08.pdf/ pp. 73-80.

(Continued)

*Primary Examiner* — Andrew C Flanders
(74) *Attorney, Agent, or Firm* — Fenwick & West LLP

(57) ABSTRACT

This invention is directed to an audio menu provided in an electronic device having no display. The electronic device can further include an input interface having only a single sensing element (e.g., a single button) for controlling audio playback of the device and for accessing and controlling the device audio menu. In response to a particular input detected by the single sensing element, the electronic device can enable an audio menu mode and play back audio clips associated with different menu options. The user can provide selection instructions using the single sensing element during the playback of an audio clip to select the menu option associated with the played back audio clip. In some embodiments, the audio menu can be multi-dimensional (e.g., the device plays back audio clips for sub-options in response to a selection of a menu option). Suitable menu options can include, for example, groupings of audio (e.g., playlists), options to toggle (e.g., a shuffle option), or options associated with particular metadata tags associated with audio available to the device.

38 Claims, 6 Drawing Sheets

(56) References Cited

U.S. PATENT DOCUMENTS

| | | |
|---|---|---|
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,001,774 A | 3/1991 | Lee |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Von Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |

(56) References Cited

U.S. PATENT DOCUMENTS

| | | |
|---|---|---|
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,707 B1 | 11/2001 | Bangalore et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,590,303 B1 | 7/2003 | Austin et al. |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |

(56) References Cited

U.S. PATENT DOCUMENTS

| | | |
|---|---|---|
| 6,810,379 B1 | 10/2004 | Vermeulen et al. |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,089,292 B1 | 8/2006 | Roderick et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,904 B2 | 6/2007 | Luisi |
| 7,277,854 B2 | 10/2007 | Bennett et al. |
| 7,290,039 B1 | 10/2007 | Lisitsa et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,936 B2 | 2/2011 | Longé et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |

(56) References Cited

U.S. PATENT DOCUMENTS

| | | |
|---|---|---|
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 2001/0027396 A1* | 10/2001 | Sato .............................. 704/260 |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0164000 A1 | 11/2002 | Cohen et al. |
| 2002/0198714 A1 | 12/2002 | Zhou |
| 2003/0086699 A1 | 5/2003 | Benyamin et al. |
| 2003/0158737 A1 | 8/2003 | Csicsatka |
| 2004/0135701 A1 | 7/2004 | Yasuda et al. |
| 2004/0236778 A1 | 11/2004 | Junqua et al. |
| 2005/0015254 A1* | 1/2005 | Beaman ..................... 704/270.1 |
| 2005/0045373 A1 | 3/2005 | Born |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0283729 A1* | 12/2005 | Morris et al. .................. 715/720 |
| 2005/0288936 A1 | 12/2005 | Busayapongchai et al. |
| 2006/0018492 A1 | 1/2006 | Chiu et al. |
| 2006/0095848 A1 | 5/2006 | Naik |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0168150 A1 | 7/2006 | Naik et al. |
| 2006/0291666 A1* | 12/2006 | Ball et al. ....................... 381/58 |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0156410 A1 | 7/2007 | Stohr et al. |
| 2007/0174188 A1 | 7/2007 | Fish |
| 2007/0180383 A1 | 8/2007 | Naik |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0046820 A1 | 2/2008 | Lee et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |

(56) References Cited

U.S. PATENT DOCUMENTS

| | | |
|---|---|---|
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 (A1) | 10/2002 |
| EP | 1435620 A1 | 7/2004 |
| EP | 1181802 B1 | 2/2007 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003517158 (A) | 5/2003 |
| JP | 2009 036999 | 2/2009 |
| KR | 1020060011603 | 2/2006 |
| KR | 1020070024262 | 3/2007 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | 0130047 A2 | 4/2001 |
| WO | WO 02/073603 A1 | 9/2002 |
| WO | 03094489 A1 | 11/2003 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Alfred App, 2011, http://www.alfredapp.com/, 5 pages.
Ambite, JL., et al., "Design and Implementation of the CALO Query Manager," Copyright© 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds And Plays Whatever You Ask for," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

(56) References Cited

OTHER PUBLICATIONS

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug., 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/senntech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The lntraspect Knowledge Management Solution: Technical Overview," http://tomgruber.org/writing/intraspect-whitepaper-1998.pdf, 18 pages.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, No. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

(56) References Cited

OTHER PUBLICATIONS

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mälhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, Al Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http://www.technologyreview.conn/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakTolt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube, "Send Text, Listen to and Send E-Mail 'By Voice' www.voiceassist.com," 2:11 minute video uploaded to YouTube by VoiceAssist on Jul 30, 2009, http://www.youtube.corin/watch?v=0tEU61nHHA4, 1 page.

YouTube, "Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

International Search Report and Written Opinion dated Nov. 29, 2011, received in International Application No. PCT/US2011/20861, which corresponds to U.S. Appl. No. 12/987,982, 15 pages. (Thomas Robert Gruber).

Elio, R. et al., "On Abstract Task Models and Conversation Policies," http://webdocs.cs.ualberta.ca/~ree/publications/papers2/ATS.AA99.pdf, May 1999, 10 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

KIPO's Notice of Prliminary Rejection (English Translation) for Korean Patent Application No. 10-2010-8828, 7 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

*Phoenix Solutions, Inc. v. West Interactive Corp.*, Document 40, Declaration of Christopher Schmandt Regarding the MIT Galaxy System dated Jul. 2, 2010, 162 pages.

Rice, J., et al., "Using the Web Instead of a Window System," Knowledge Systems Laboratory, Stanford University, (http://tomgruber.org/writing/ks1-95-69.pdf, Sep. 1995.) CHI '96 Proceedings: Conference on Human Factors in Computing Systems, Apr. 13-18, 1996, Vancouver, BC, Canada, 14 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

Acero, A., et al., "Environmental Robustness in Automatic Speech Recognition," International Conference on Acoustics, Speech, and Signal Processing (ICASSP'90), Apr. 3-6, 1990, 4 pages.

Acero, A., et al., "Robust Speech Recognition by Normalization of The Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

(56) References Cited

OTHER PUBLICATIONS

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanovie, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.

Bellegarda, J. R., "A Latent Semantic Analysis Framework for Large-Span Language Modeling," 5th European Conference on Speech, Communication and Technology, (Eurospeech'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

Conklin, J., "Hypertext: An Introduction and Survey," Computer Magazine, Sep. 1987, 25 pages.

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

Deerwester, S., et al., "Indexing by Latent Semantic Analysis," Journal of the American Society for Information Science, vol. 41, No. 6, Sep. 1990, 19 pages.

Deller, Jr., J. R., et al., "Discrete-Time Processing of Speech Signals," © 1987 Prentice Hall, ISBN: 0-02-328301-7, 14 pages.

Digital Equipment Corporation, "Open VMS Software Overview," Dec. 1995, software manual, 159 pages.

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.

Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.

Gorin, A. L., et al., "On Adaptive Acquisition of Language," International Conference on Acoustics, Speech, and Signal Processing (ICASSP'90), vol. 1, Apr. 3-6, 1990, 5 pages.

Gotoh, Y., et al., "Document Space Models Using Latent Semantic Analysis," In Proceedings of Eurospeech, 1997, 4 pages.

(56) References Cited

OTHER PUBLICATIONS

Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," in Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The Sphinx System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-Harpy Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

(56) References Cited

OTHER PUBLICATIONS

Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
Van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
Chinese Final Rejection dated Mar. 1, 2013 for Application No. 201010109130.0, which corresponds to U.S. Appl. No. 12/363,513, 15 pages.
Office Action dated Mary 13, 2013, received in United Kingdom patent application No. GB1001414.0, which corresponds to U.S. Appl. No. 12/363,513, 6 pages. (Rottler).
International Search Report dated Nov. 9, 1994, received in International Application No. PCT/US1993/12666, which corresponds to U.S. Appl. No. 07/999,302, 8 pages. (Robert Don Strong).
International Preliminary Examination Report dated Mar. 1, 1995, received in International Application No. PCT/US1993/12666, which corresponds to U.S. Appl. No. 07/999,302, 5 pages. (Robert Don Strong).
International Preliminary Examination Report dated Apr. 10, 1995, received in International Application No. PCT/US1993/12637, which corresponds to U.S. Appl. No. 07/999,354, 7 pages. (Alejandro Acero).
International Search Report dated Feb. 8, 1995, received in International Application No. PCT/US1994/11011, which corresponds to U.S. Appl. No. 08/129,679, 7 pages. (Yen-Lu Chow).

(56) References Cited

OTHER PUBLICATIONS

International Preliminary Examination Report dated Feb. 28, 1996, received in International Application No. PCT/US1994/11011, which corresponds to U.S. Appl. No. 08/129,679, 4 pages. (Yen-Lu Chow).
Written Opinion dated Aug. 21, 1995, received in International Application No. PCT/US1994/11011, which corresponds to U.S. Appl. No. 08/129,679, 4 pages. (Yen-Lu Chow).
International Search Report dated Nov. 8, 1995, received in International Application No. PCT/US1995/08369, which corresponds to U.S. Appl. No. 08/271,639, 6 pages. (Peter V. De Souza).
International Preliminary Examination Report dated Oct. 9, 1996, received in International Application No. PCT/US1995/08369, which corresponds to U.S. Appl. No. 08/271,639, 4 pages. (Peter V. De Souza).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/cre024/paper.ps.Z. 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom.2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness— 'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.

(56) References Cited

OTHER PUBLICATIONS

Dowding, J., et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of US Patent No. 7,177,798, Mar. 22, 2013, 1 page.

Exhibit 1, "Natural Language Interface Using Constrained Intermediate Dictionary of Results," List of Publications Manually reviewed for the Search of US Patent No. 7,177,798, Mar. 22, 2013, 1 page.

Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.

Fikes, R., et al., "A Network-based knowledge Representation and its Natural Deduction System," Jul. 1977, SRI International, 43 pages.

Gambäck, B., et al., "The Swedish Core Language Engine," 1992 NOTEX Conference, 17 pages.

Glass, J., et al., "Multilingual Language Generation Across Multiple Domains," Sep. 18-22, 1994, International Conference on Spoken Language Processing, Japan, 5 pages.

Green, C. "The Application of Theorem Proving to Question-Answering Systems," Jun. 1969, SRI Stanford Research Institute, Artificial Intelligence Group, 169 pages.

Gregg, D. G., "DSS Access on the WWW: An Intelligent Agent Prototype," 1998 Proceedings of the Americas Conference on Information Systems-Association for Information Systems, 3 pages.

Grishman, R., "Computational Linguistics: An Introduction," © Cambridge University Press 1986, 172 pages.

Grosz, B. et al., "Dialogic: A Core Natural-Language Processing System," Nov. 9, 1982, SRI International, 17 pages.

Grosz, B. et al., "Research on Natural-Language Processing at SRI," Nov. 1981, SRI International, 21 pages.

Grosz, B., et al., "TEAM: An Experiment in the Design of Transportable Natural-Language Interfaces," Artificial Intelligence, vol. 32, 1987, 71 pages.

Grosz, B., "Team: A Transportable Natural-Language Interface System," 1983, Proceedings of the First Conference on Applied Natural Language Processing, 7 pages.

Guida, G., et al., "NLI: A Robust Interface for Natural Language Person-Machine Communication," Int. J. Man-Machine Studies, vol. 17, 1982, 17 pages.

Guzzoni, D., et al., "Active, A platform for Building Intelligent Software," Computational Intelligence 2006, 5 pages. http://www.informatik.uni-trier.de/~ley/pers/hd/g/Guzzoni:Didier.

Guzzoni, D., "Active: A unified platform for building intelligent assistant applications," Oct. 25, 2007, 262 pages.

Guzzoni, D., et al., "Many Robots Make Short Work," 1996 AAAI Robot Contest, SRI International, 9 pages.

Haas, N., et al., "An Approach to Acquiring and Applying Knowledge," Nov. 1980, SRI International, 22 pages.

Hadidi, R., et al., "Students' Acceptance of Web-Based Course Offerings: An Empirical Assessment," 1998 Proceedings of the Americas Conference on Information Systems (AMCIS), 4 pages.

Hawkins, J., et al., "Hierarchical Temporal Memory: Concepts, Theory, and Terminology," Mar. 27, 2007, Numenta, Inc., 20 pages.

He, Q., et al., "Personal Security Agent: KQML-Based PKI," The Robotics Institute, Carnegie-Mellon University, paper, Oct. 1, 1997, 14 pages.

Hendrix, G. et al., "Developing a Natural Language Interface to Complex Data," ACM Transactions on Database Systems, vol. 3, No. 2, Jun. 1978, 43 pages.

Hendrix, G., "Human Engineering for Applied Natural Language Processing," Feb. 1977, SRI International, 27 pages.

Hendrix, G., "Klaus: A System for Managing Information and Computational Resources," Oct. 1980, SRI International, 34 pages.

Hendrix, G., "Lifer: A Natural Language Interface Facility," Dec. 1976, SRI Stanford Research Institute, Artificial Intelligence Center, 9 pages.

Hendrix, G., "Natural-Language Interface," Apr.-Jun. 1982, American Journal of Computational Linguistics, vol. 8, No. 2, 7 pages. Best Copy Available.

Hendrix, G., "The Lifer Manual: A Guide to Building Practical Natural Language Interfaces," Feb. 1977, SRI International, 76 pages.

Hendrix, G., et al., "Transportable Natural-Language Interfaces to Databases," Apr. 30, 1981, SRI International, 18 pages.

Hirschman, L., et al., "Multi-Site Data Collection and Evaluation in Spoken Language Understanding," 1993, Proceedings of the workshop on Human Language Technology, 6 pages.

Hobbs, J., et al., "Fastus: A System for Extracting Information from Natural-Language Text," Nov. 19, 1992, SRI International, Artificial Intelligence Center, 26 pages.

Hobbs, J., et al.,"Fastus: Extracting Information from Natural-Language Texts," 1992, SRI International, Artificial Intelligence Center, 22 pages.

Hobbs, J., "Sublanguage and Knowledge," Jun. 1984, SRI International, Artificial Intelligence Center, 30 pages.

Hodjat, B., et al., "Iterative Statistical Language Model Generation for Use with an Agent-Oriented Natural Language Interface," vol. 4 of the Proceedings of HCI International 2003, 7 pages.

Huang, X., et al., "The SPHINX-II Speech Recognition System: An Overview," Jan. 15, 1992, Computer, Speech and Language, 14 pages.

Issar, S., et al., "CMU's Robust Spoken Language Understanding System," 1993, Proceedings of EUROSPEECH, 4 pages.

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.

Julia, L., et al., "http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Katz, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP &IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html. 2 pages.

(56) References Cited

OTHER PUBLICATIONS

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages. Best Copy Available.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages. Best Copy Available.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-lg/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993. html#RaynerBCCDGKKLPPS93.

Rudnicky, A.I., et al., "Creating Natural Dialogs in the Carnegie Mellon Communicator System,".

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H., "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (Interact'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

Shinkle, L., "Team User's Guide," Nov. 1984, SRI International, Artificial Intelligence Center, 78 pages.

Shklar, L., et al., "Info Harness: Use of Automatically Generated Metadata for Search and Retrieval of Heterogeneous Information," 1995 Proceedings of CAiSE'95, Finland.

Singh, N., "Unifying Heterogeneous Information Models," 1998 Communications of the ACM, 13 pages.

(56) References Cited

OTHER PUBLICATIONS

SRI2009, "SRI Speech: Products: Software Development Kits: EduSpeak," 2009, 2 pages, available at http://web.archive.org/web/20090828084033/http://www.speechatsri.com/products/eduspeak.shtml.

Starr, B., et al., "Knowledge-Intensive Query Processing," May 31, 1998, Proceedings of the 5th KRDB Workshop, Seattle, 6 pages.

Stern, R., et al. "Multiple Approaches to Robust Speech Recognition," 1992, Proceedings of Speech and Natural Language Workshop, 6 pages.

Stickel, "A Nonclausal Connection-Graph Resolution Theorem-Proving Program," 1982, Proceedings of AAAI'82, 5 pages.

Sugumaran, V., "A Distributed Intelligent Agent-Based Spatial Decision Support System," Dec. 31, 1998, Proceedings of the Americas Conference on Information systems (AMCIS), 4 pages.

Sycara, K., et al., "Coordination of Multiple Intelligent Software Agents," International Journal of Cooperative Information Systems (IJCIS), vol. 5, Nos. 2 & 3, Jun. & Sep. 1996, 33 pages.

Sycara, K., et al., "Distributed Intelligent Agents," IEEE Expert, vol. 11, No. 6, Dec. 1996, 32 pages.

Sycara, K., et al., "Dynamic Service Matchmaking Among Agents in Open Information Environments," 1999, SIGMOD Record, 7 pages.

Sycara, K., et al., "The RETSINA MAS Infrastructure," 2003, Autonomous Agents and Multi-Agent Systems, vol. 7, 20 pages.

Tyson, M., et al., "Domain-Independent Task Specification in the TACITUS Natural Language System," May 1990, SRI International, Artificial Intelligence Center, 16 pages.

Wahlster, W., et al., "Smartkom: multimodal communication with a life-like character," 2001 EUROSPEECH-Scandinavia, 7th European Conference on Speech Communication and Technology, 5 pages.

Waldinger, R., et al., "Deductive Question Answering from Multiple Resources," 2003, New Directions in Question Answering, published by AAAI, Menlo Park, 22 pages.

Walker, D., et al., "Natural Language Access to Medical Text," Mar. 1981, SRI International, Artificial Intelligence Center, 23 pages.

Waltz, D., "An English Language Question Answering System for a Large Relational Database," © 1978 ACM, vol. 21, No. 7, 14 pages.

Ward, W., et al., "A Class Based Language Model for Speech Recognition," © 1996 IEEE, 3 pages.

Ward, W., et al., "Recent Improvements in the CMU Spoken Language Understanding System," 1994, ARPA Human Language Technology Workshop, 4 pages.

Ward, W., "The CMU Air Travel Information Service: Understanding Spontaneous Speech," 3 pages.

Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.

Weizenbaum, J., "ELIZA—A Computer Program for the Study of Natural Language Communication Between Man and Machine," Communications of the ACM, vol. 9, No. 1, Jan. 1966, 10 pages.

Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.

Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.

Yang, J., et al., "Smart Sight: A Tourist Assistant System," 1999 Proceedings of Third International Symposium on Wearable Computers, 6 pages.

Zeng, D., et al., "Cooperative Intelligent Software Agents," The Robotics Institute, Carnegie-Mellon University, Mar. 1995, 13 pages.

Zhao, L., "Intelligent Agents for Flexible Workflow Systems," Oct. 31, 1998 Proceedings of the Americas Conference on Information Systems (AMCIS), 4 pages.

Zue, V., et al., "From Interface to Content: Translingual Access and Delivery of On-Line Information," 1997, EUROSPEECH, 4 pages.

Zue, V., et al., "Jupiter: A Telephone-Based Conversational Interface for Weather Information," Jan. 2000, IEEE Transactions on Speech and Audio Processing, 13 pages.

Zue, V., et al., "Pegasus: A Spoken Dialogue Interface for On-Line Air Travel Planning," 1994 Elsevier, Speech Communication 15 (1994), 10 pages.

Zue, V., et al., "The Voyager Speech Understanding System: Preliminary Development and Evaluation," 1990, Proceedings of IEEE 1990 International Conference on Acoustics, Speech, and Signal Processing, 4 pages.

Bussler, C., et al., "Web Service Execution Environment (WSMX)," Jun. 3, 2005, W3C Member Submission, http://www.w3.org/Submission/WSMX, 29 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Roddy, D., et al., "Communication and Collaboration in a Landscape of B2B eMarketplaces," VerticalNet Solutions, white paper, Jun. 15, 2000, 23 pages.

Office Action dated Mar. 2, 2012, received in United Kingdom patent application No. GB1001414.0, which corresponds to U.S. Appl. No. 12/363,513, 4 pages (Rottler).

Office Action dated Apr. 21, 2011, received in Chinese patent application No. 201010109130.0, which corresponds to U.S. Appl. No. 12/363,513, 19 pages. (Rottler).

Office Action dated Oct. 26, 2011, received in Chinese patent application No. 201010109130.0, which corresponds to U.S. Appl. No. 12/363,513, 13 pages. (Rottler).

Office Action dated Mar. 21, 2012, received in Chinese patent application No. 201010109130.0, which corresponds to U.S. Appl. No. 12/363,513, 23 pages. (Rottler).

European Search Report dated Apr. 14, 2010, received in Application No. EP10151963.5, which corresponds to U.S. Appl. No. 12/363,513, 9 pages. (Benjamin Rottler).

GB Patent Act 1977: Combined Search and Examination Report under Sections 17 and 18(3) dated May 26, 2010, received in Application No. GB1001414.0, 8 pages. (Benjamin Rottler).

International Search Report and Written Opinion dated Mar. 3, 2010, received in International Application No. PCT/US2009/069052, which corresponds to U.S. Appl. No. 12/363,513, 11 pages. (Benjamin Rottler).

International Preliminary Report on Patentability dated Jun. 3, 2011, received in International Application No. PCT/US2009/069052, which corresponds to U.S. Appl. No. 12/363,513, 11 pages. (Benjamin Rottler).

\* cited by examiner

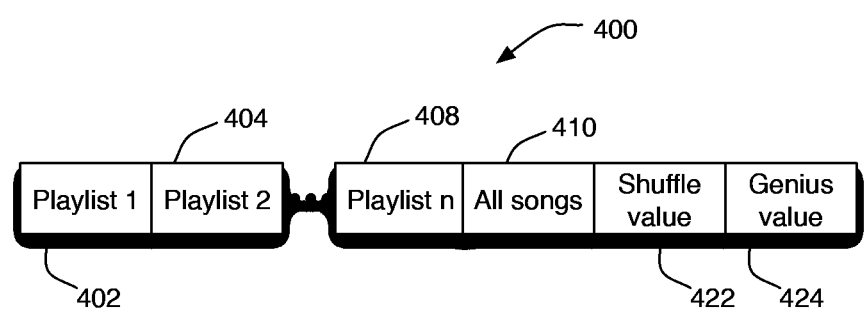

AUDIO USER INTERFACE FOR DISPLAYLESS ELECTRONIC DEVICE

BACKGROUND OF THE INVENTION

This is directed to providing an audio user interface for an electronic device that does not have a display.

Users can interact with electronic devices using different interfaces. For example, if a device includes a display, the device processor can direct the display to display a graphical user interface. The graphical user interface can include information displayed for the user, such as application windows, text or images, or any other suitable information stored locally or retrieved from a remote source (e.g., the Internet or a host device). The graphical user interface can also include displayed selectable options that the user can select to direct the electronic device to perform operations. Such operations can include, for example, operations tied to particular applications, instructions to open or display information, instructions to close or end a process or application, or any other suitable electronic device operation. To select a displayed option, the user can provide an instruction using an input interface coupled to the device.

Not every electronic device, however, includes a display. To control different device operations, the electronic device can have different input interfaces each associated with different operations. For example, the electronic device can include several buttons associated with different operations. In some embodiments, a portable media device can include distinct buttons for controlling playback operations, for example buttons for each of play/pause, next/fast forward, previous/rewind, volume up, and volume down.

As the size of electronic devices reduces, the input interface can become a limiting factor to the size reduction. For example, the size of an electronic device can be reduced so that the device includes no display and only a single input interface (e.g., a single button). As another example, the size of the electronic device can be reduced such that the device does not include an input interface, but rather is coupled to a remote input interface (e.g., coupled to an in-cable button connected to a port of the device). If the device includes only a single input interface and no display, the device can require an audio-based user interface to allow the user to control device operations.

SUMMARY OF THE INVENTION

This invention is directed to systems and methods for providing an audio user interface in a device having only a single input interface and no display.

To control simple audio playback operations, the electronic device can associate different types of inputs provided by the single input interface with different simple operations. For example, the electronic device can associate different combinations of short and elongated presses of a button with different playback controls (e.g., play/pause, fast forward, and rewind). There may be insufficient suitable combinations of inputs using the single input interface, however, to provide instructions for more complex electronic device operations. In addition, a user may require some information before being able to direct the device to perform an operation using a single input interface (e.g., which of several playlists is the user selecting with an input).

The electronic device can include an audio menu operative to provide information to the user regarding the current audio being played back, and subsequently provide specific options that the user can select. Because the electronic device can have no display, the audio menu can include a succession of audio clips defining the available options for the device. For example, in response to receiving a user instruction to access an audio menu, the electronic device can initially play back an audio clip based on metadata characterizing the currently played back audio (e.g., a track announcement of the title and artist of the currently played back music) and then play back audio clips associated with available menu options. The user can provide a selection instruction during the playback of an audio clip to select the menu option associated with the audio clip.

The audio menu can include any suitable selectable option. For example, the selectable options can include playlists (e.g., playlist names or numbers), audiobook titles, options to toggle (e.g., shuffle and genius options), or any other suitable option for selecting all or a subset of the available audio. In some embodiments, the options can include metadata tag values or categories for selecting audio matching a selected tag or category value (e.g., all audio by a particular artist, or in a particular album). The menu can allow a user to refine an audio request using a multi-dimensional menu, for example by providing successive options and sub-options for selecting several different types of metadata tags to define the audio subset to play back.

The electronic device can receive or generate the audio clips to play back in the audio menu using any suitable approach. In some embodiments, the audio clips can be recorded and received from a host device. Alternatively, the audio clips can be generated using a text-to-speech engine of the device or of a host device. The host device can provide any suitable content to the electronic device, including for example audio clips for the audio menu, audio to play back (e.g., music), firmware or software updates, or any other suitable information. In some embodiments, the electronic device can provide text strings for which audio clips are necessary to the host device so that the host device can generate the audio clips using a text-to-speech engine.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 4 is a schematic view of an array of menu options for which audio clips can be played back in accordance with one embodiment of the invention;

FIG. 5 is a schematic view of a multi-dimensional array of menu options for which audio clips can be played back in accordance with one embodiment of the invention;

DETAILED DESCRIPTION

Figure 1:
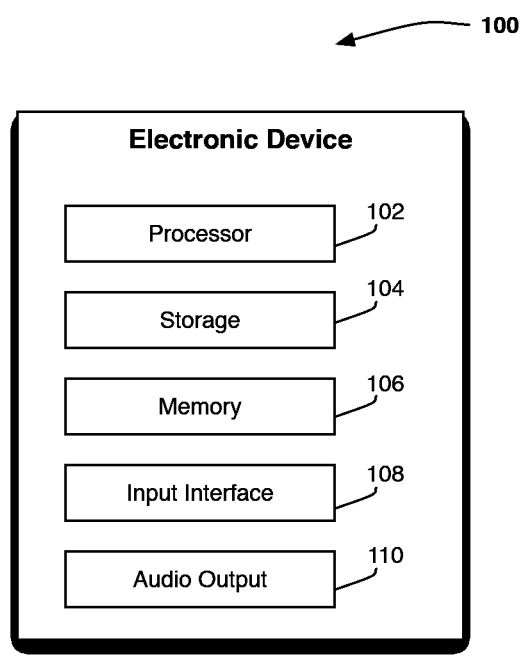
FIG. 1 is a schematic view of an electronic device in accordance with one embodiment of the invention.

An electronic device operative to provide an audio menu is provided.

The electronic device may include a processor and a user interface having at least one sensing element, for example a mechanical sensing element (e.g., a button), a resistive sensing element (e.g., a resistive sensor), or a capacitive sensing element (e.g., a capacitive sensor). The input interface can be integrated in the device, or remotely coupled to the device (e.g., via a cable or wirelessly). Using the input interface, a user can provide inputs to control media playback. For example, the user can provide play/pause, next track, fast forward, previous track, and rewind instructions by providing different combinations of inputs using the input interface (e.g., different numbers and durations of button presses of a single button coupled to the electronic device). To control more advanced or elaborate electronic device operations, the electronic device may include an audio menu mode that the user can access by providing a particular input using the input interface (e.g., an elongated button press). In some embodiments, the user can control media playback and access and navigate the audio menu by providing inputs to a single sensing element of the input interface (e.g., inputs to a single mechanical button). In addition, the inputs detected by the single sensing mechanism can be of substantially the same type (e.g., button presses, finger contacts, or finger swipes) and inputs that are not associated with selecting an option displayed on a screen (e.g., selecting an option displayed on a capacitive touch screen).

In response to receiving the input for enabling the audio menu, the electronic device can play back an initial audio clip associated with the audio menu. For example, the initial audio clip can indicate the current audio being played back by the device, or the playlist with which the current audio is associated. As another example, the initial audio clip can include an indication of the current mode of operation of the device. Following the initial indication, the electronic device can play back audio clips associated with options for different operations of the device. As the subsequent audio clips are played back, the user can provide inputs for skipping or selecting the associated options. For example, the user can provide a first input (e.g., a single button press using a predetermined button) to select the option associated with the currently played back audio clip, and a second input (e.g., an elongated button press using the same predetermined button) to skip to the audio clip for the next option in the menu.

In some embodiments, the audio user interface can include a multi-dimensional menu. For example, one or more of the selectable options can be associated with subsequent sub-options. Suitable sub-options can include, for example, options related to particular metadata tags of media such as artist name, song title, album name, genre, or any other suitable metadata tag. Using different inputs provided using the input interface, a user can navigate the audio menu to select options or sub-options, return to a previous menu level, or exit the audio menu mode.

FIG. 1 is a schematic view of an electronic device in accordance with one embodiment of the invention. Electronic device 100 may include processor 102, storage 104, memory 106, input interface 108, and audio output 110. In some embodiments, one or more of electronic device components 100 may be combined or omitted (e.g., combine storage 104 and memory 106). In some embodiments, electronic device 100 may include other components not combined or included in those shown in FIG. 1 (e.g., a power supply or a bus), or several instances of the components shown in FIG. 1. For the sake of simplicity, only one of each of the components is shown in FIG. 1.

Processor 102 may include any processing circuitry operative to control the operations and performance of electronic device 100. For example, processor 100 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Input interface 108 may include any suitable interface for providing inputs to input/output circuitry of the electronic device. Input interface 108 may include any suitable input interface, such as for example, a button, keypad, dial, a click wheel, a touch pad, or any combination thereof. The input interface can detect user inputs using at least one sensing element, such as a mechanical sensor, resistive sensor, capacitive sensor, a multi-touch capacitive sensor, or any other suitable type of sensing element. In some embodiments, to minimize the overall dimensions of electronic device 100, input interface 108 can include a limited number (e.g., one) of sensing elements operative to detect inputs to the device. Any suitable event sensed by the sensing element can be used to define an input. For example, an input can be detected when a sensor detects an initial event interaction from the user (e.g., the user presses a button). As another example, an input can be detected when a sensor detects the end of an event or interaction from a user (e.g., the user releases a button). As still another example, an input can be detected both when an interaction is initially detected and when the same interaction ends (e.g., a first input when the user presses and holds the button, for example to enter an audio menu mode, and a second input when the user releases the button, for example to select an option from the audio menu).

To further reduce the size of the device, the one or more sensing elements can be remotely coupled to the device, for example wirelessly or via a wire or cable (e.g., a button embedded in a headphone wire). In some embodiments, the input interface can include an assembly having two volume control buttons and a single playback and menu control button placed between the two volume buttons, where the buttons each include a single mechanical sensing element and the assembly is positioned on a headphone wire. In such embodiments, no input interface can be located on the electronic device (e.g., or only a hold switch).

In some embodiments, the input interface can include several sensing elements for controlling media playback, enabling a menu mode, and providing menu navigation and selection instructions. For example, the input interface can include a limited number of sensing elements for controlling the various device operations. In one implementation, the electronic device can include several buttons, each associated with mechanical sensing elements (e.g., dome switches), where different combinations of the several buttons (e.g., two or three buttons) can be used to control media playback, access an audio menu, select audio menu options, and navigate the audio menu. For example, a first button can be used to control media playback, access the audio menu, and select audio menu options, and a second and third button can be used to navigate between options and sub-options within the audio menu.

Audio output 110 may include one or more speakers (e.g., mono or stereo speakers) built into electronic device 100, or an audio connector (e.g., an audio jack or an appropriate Bluetooth connection) operative to be coupled to an audio output mechanism. For example, audio output 110 may be operative to provide audio data using a wired or wireless connection to a headset, headphones or earbuds. In some embodiments, input interface 108 can be incorporated in a portion of audio output 110 (e.g., embedded in the headphone wire).

One or more of input interface 108 and audio output 110 may be coupled to input/output circuitry. The input/output circuitry may be operative to convert (and encode/decode, if necessary) analog signals and other signals into digital data. In some embodiments, the input/output circuitry can also convert digital data into any other type of signal, and vice-versa. For example, the input/output circuitry may receive and convert physical contact inputs (e.g., from a touch pad), physical movements (e.g., from a mouse or sensor), analog audio signals (e.g., from a microphone), or any other input. The digital data can be provided to and received from processor 102, storage 104, memory 106, or any other component of electronic device 100. In some embodiments, several instances of the input/output circuitry can be included in electronic device 100.

In some embodiments, electronic device 100 may include a bus operative to provide a data transfer path for transferring data to, from, or between control processor 102, storage 104, memory 106, input interface 108, sensor 110, and any other component included in the electronic device. Such other components can include, for example, communications circuitry, positioning circuitry, motion detection circuitry, or any other suitable component. In some embodiments, communications circuitry can be used to connect the electronic device to a host device from which media such as audio, metadata related to the audio, and playlists or other information for managing the received audio.

Figure 2:
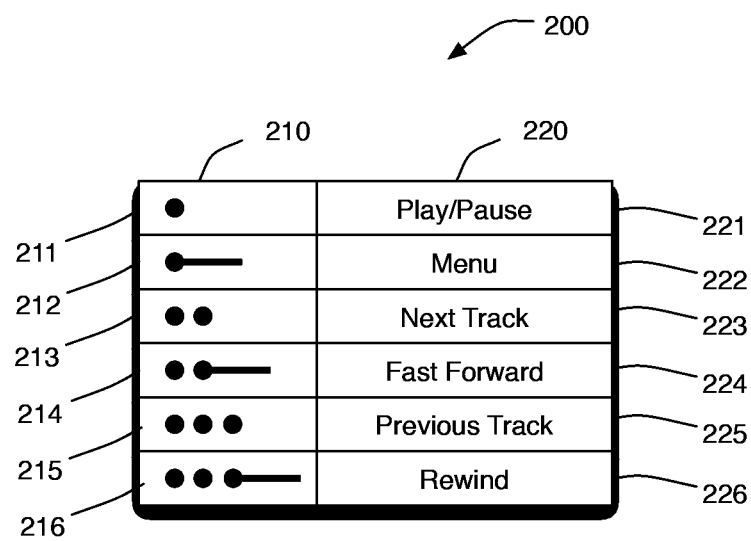
FIG. 2 is a table depicting electronic device operations associated with different inputs from the input interface in accordance with one embodiment of the invention.

The electronic device can perform any suitable operation in response to detecting particular inputs from the input interface. FIG. 2 is a table depicting electronic device operations associated with different inputs from the input interface in accordance with one embodiment of the invention. Table 200 can include column 210 of inputs and column 220 of associated electronic device operations. Column 210 can include any suitable input, including presses of a button (e.g., as illustrated in FIG. 2). For example, column 210 can include single press 211, extended single press 212, double press 213, double extended press 214, triple press 215, and triple extended press 216. Different electronic device operations can be associated with each of the inputs. For example, column 220 can include play/pause 221, menu 222, next track 223, fast-forward 224, previous track 225, and rewind 226, each associated with the input from the corresponding row in column 210. In some embodiments, other inputs can be associated with particular electronic device operations, such as longer combinations of button presses (e.g., four or more button presses), or combinations of short and long presses (e.g., several long presses, or consecutive short and long presses, such as in Morse code). Other electronic device operations associated with the inputs can include, for example, non-media playback operations such as communications operations (e.g., telephone, text message or e-mail operations), information display operations (e.g., displaying weather, traffic, or mapping information), or operations for accessing a remote database (e.g., web browsing operations or remote access operations).

Figure 3:
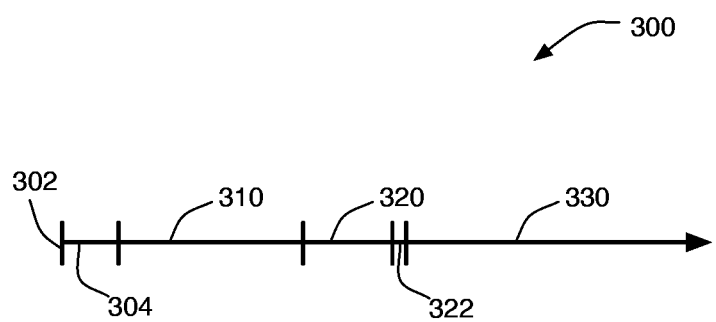
FIG. 3 is a schematic view of an illustrative diagram indicating the audio clips played back in the menu mode in accordance with one embodiment of the invention.

To access more advanced media operations (e.g., non playback control operations), a user can provide an input associated with a menu command or operation. In the example of FIG. 2, this input can include a single extended input using the input interface (e.g., a single extended press of a button). In response to detecting the menu command input, the electronic device can enable a menu mode of the device. The electronic device can provide any suitable indication of the menu mode. FIG. 3 is a schematic view of an illustrative diagram indicating the audio clips played back in the menu mode in accordance with one embodiment of the invention. Diagram 300 can include a timeline beginning at end 302, and separated into several sections by vertical lines. During section 304, the electronic device can duck the currently played back audio (e.g., played back music). For example, the electronic device can duck the audio by a predetermined amount (e.g., reduce the audio by 50%). As another example, the electronic device can duck the audio to a predetermined value (e.g., reduce the audio to 30% of the audio output). The predetermined value can include a volume setting (e.g., 30% volume), an energy level of the audio (e.g., 30% of the highest energy or audio wave amplitude of the music), an audio strength amount (e.g., a number of dB). Section 304 can have any suitable duration, including for example a duration in the range of 50 ms to 800 ms, such as 300 ms. At the end of section 304, the electronic device can pause the currently played back audio, or continue to playback the audio at the ducked audio level.

Once the played back audio has been ducked and paused, or simply ducked, the electronic device can announce the currently playing back audio during section 310. For example, the electronic device can play back an audio clip associated with the title, artist, album, or any combination thereof, of the currently played back audio. The electronic device can play back audio clips associated with any suitable information for the currently played back audio. For example, the audio clips can be associated with metadata tags of the played back audio. As another example, the audio clips can include a portion of the played back audio (e.g., a sample of the played back audio). The electronic device can play back audio clips for any suitable combination of tags or data associated with the played back audio, including for example the artist name and audio title (e.g., for a song) or the book name and chapter name (e.g., for an audio book). In embodiments where the played back media is ducked and continues to be played back during section 310, the electronic device can set the volume of the track announce audio clip at a level substantially higher than the ducked media.

Once the currently playing back audio has been announced, the electronic device can pause during section 320 to allow the user to exit the menu mode without selecting new audio to playback, or without hearing the menu options. For example, a user can exit the audio menu mode by providing a second selection instruction during section 320, or ending the selection instruction used to initially access the audio menu mode (e.g., release a button press that was held during sections 304 and 310). Section 320 may thus be of particular interest when users wish only to identify the currently playing back song (e.g., and cannot simply view a displayed artist name and title, as there is no display with the device). Section 320 can have any suitable duration, including for example a duration in the range of 100 ms to 1200 ms, such as 500 ms. Once the duration of section 320 lapses, the electronic device can provide an audio indication that the menu options will be provided. For example, during section 322, the electronic device can provide an audio tone or beep to indicate the end of the track announce portion of the audio menu. In some embodiments, the electronic device can instead provide the menu options without first providing an audio indication.

Following the audio tone of section 322, the electronic device can provide, in section 330, audio associated with selectable menu options. The audio clips provided in section 330 can include clips for any suitable option, including for example playlists, audio books, options to toggle for controlling playback (e.g., shuffle on/off or a seed-based playlist on/off options), or any other suitable audio compilation. The particular options for which audio clips are played back will be described in more detail below. In particular, the seed-based playlist option can be related to the Genius playlist option available from iTunes, available from Apple Inc., by which a playlist of media related to a seed can be automatically generated.

The audio clips associated with the audio menu (e.g., with the sections of diagram 300) can be played back in any suitable manner. In some embodiments, the audio clips can be automatically played back sequentially (e.g., auto-played) in response to accessing the audio menu (e.g., in response to a first input to enter the menu mode, such as a single, elongated press of a button, as indicated in table 200, FIG. 2). The user can then provide a subsequent input at any time during the playback of audio clips. In response to a subsequent input prior to or during the audio tone of section 322, the electronic device can exit the audio menu mode, re-increase the ducked audio (and resume playback of the paused media item, if it was paused during section 304 or section 310), and continue to play back the audio played back prior to entering the menu mode. In response to a subsequent input after the audio tone of section 322 (or after the duration of section 322 lapses), the electronic device can identify the playlist or other option associated with the audio clip played back when the subsequent input was received. The electronic device can then play back audio from the identified playlist, or perform the operation associated with the selected option. In addition, the electronic device may associate particular inputs of the input interface with exiting the menu mode (e.g., even after playing the audio tone and beginning to play back playlists), or skipping forward and back between audio options. For example, a single elongated input detected by the sensing element (e.g., a single press of a button) while in the menu mode can be associated with exiting the menu mode, a double input detected by the sensing element (e.g., a double press of a button) can be associated with skipping to the next audio clip, and a triple input detected by the sensing element (e.g., a triple press of a button) can be associated with skipping to the previous audio clip. As another example, inputs detected by different sensing elements such as, for example volume controls (e.g., two buttons associated with volume up and volume down commands) can be associated with navigating menu options while in the menu mode.

In some embodiments, the user can instead hold an input upon entering the menu mode. To exit the menu mode without providing a playlist selection, the user can release the input prior to or during the audio tone of section 322. To provide a selection of a playlist or other option, the user can release the input upon the device playing back the audio clip associated with the playlist or option of interest.

In some embodiments, the audio clips of the audio menu may not automatically be played back sequentially. Instead, the user can control the playback of the audio clips by providing navigation instructions. Such navigation instructions can include, for example, a single elongated press while in the menu mode to exit the menu mode, a double press to skip to the next audio clip, and a triple press to skip to the previous audio clip. As another example, volume controls (e.g., two buttons associated with volume up and volume down commands) can be associated with navigating menu options while in the menu mode.

The electronic device can provide any suitable menu options in the menu mode. FIG. 4 is a schematic view of an array of menu options for which audio clips can be played back in accordance with one embodiment of the invention. Array 400 can include several options of different types. In some embodiments, array 400 can include playlist options 402, 404 and 408. Each playlist can be identified in any suitable manner, including for example by playlist name (e.g., as set on a host device from which the playlists were received), a number, metadata associated with one or more audio items in the playlist, or any other suitable identifying information. In some embodiments, array 400 can also include options for audio books stored on the electronic device (e.g., instead of or in addition to playlist options). The playlists and audio books can be ordered in any suitable manner in array 400. In some embodiments, the order may be based on the order in which the playlists were added to the electronic device from a host device (e.g., the order in which the playlists were dragged into the electronic device using a host device application, such as iTunes available from Apple Inc.). Other suitable orders can include, for example, alphabetical (e.g., based on playlist title or metadata values), numerical (e.g., based on the number of audio items in each playlist, or on a numerical order associated with each playlist), or on any other suitable attribute of the playlists. In some embodiments, the playlist order can change based on which playlist is being played back upon entering the menu mode. For example, the electronic device can re-order the playlists to start with the current playlist (e.g., and continue with the next playlist in the set order, or continue with the first playlist in the set order).

Array 400 can include additional options, such as all songs option 410, and options that can be toggled on or off. For example, array 400 can include shuffle option 420 and genius option 422, which the user can select to turn on or off. In response to receiving a selection of a toggled option, the electronic device can change the value of the option, and either exit the menu mode, or return to the menu mode and continue or restart playing back audio clips associated with the available menu options (e.g., audio clips associated with the options of array 400). In some embodiments, the audio clips associated with toggled options can include an indication of the value of the option (e.g., the audio clip can be "shuffle on" or "shuffle off" based on the current value of the toggled option). In some embodiments, array 400 can include a repeat option and an exit option (not shown) to allow the user to either repeat the available options or to exit the audio menu mode and return to the previously played back audio. In some embodiments, array 400 can include an audio classification parameter or classification value related to the audio available for playback on the device.

In some embodiments, the audio user interface can include a multi-dimensional menu. FIG. 5 is a schematic view of a multi-dimensional array of menu options for which audio clips can be played back in accordance with one embodiment of the invention. Array 500 can include several options of different types, some or all of which can be associated with subsequent sub-options. In some embodiments, array 500 can include track announcement indication 502 for identifying the current audio played back by the device upon entering the menu mode. Track announcement indication 502 and the subsequent selectable options of array 500 can be separated using any suitable approach, including for example using an audio tone or beep (e.g., as discussed above), or without an indication to the user (e.g., options are separated by time lapses and no audio indications). Following indication 502, for example, array 500 can include several selectable options associated with metadata or other tags of audio available for playback. For example, array 500 can include titles option 510, artists option 520, albums option 530, genres option 540, and playlists option 550. Any other suitable tag or information used to classify or identify audio can be used instead or in addition to those shown in array 500. Such tags can include, for example, audiobooks, album artist, audio rating, popularity (e.g., as determined from a remote popularity index), or any other suitable tag.

In response to receiving a user selection of one of options 510, 520, 530, 540 and 550, the electronic device can provide audio clips associated with the sub-options for the particular selected option. For example, in response to receiving a user selection of titles option 510, the electronic device can play back audio clips of song titles 512. As another example, in response to receiving a user selection of artists option 520, the electronic device can play back audio clips of artists 522. As still another example, in response to receiving a user selection of albums option 530, the electronic device can play back audio clips of albums 532. As yet still another example, in response to receiving a user selection of genres option 540, the electronic device can play back audio clips of genres 542. As still another example, in response to receiving a user selection of playlists option 550, the electronic device can play back audio clips of available playlists 552 stored on the device.

If the number of sub-options associated with a selected option is too large (e.g., exceeds a pre-defined maximum value), the electronic device can instead provide an intermediate sub-option further classifying the sub-options. For example, the electronic device can provide audio clips associated with the letters of the alphabet, and subsequently the sub-options beginning with a selected letter. Alternatively, the electronic device can associate particular inputs of the input interface with quick navigation operations to allow for more rapid traverse of the sub-option audio clips (e.g., inputs for skipping forward and back between initial letters, or options for fast forwarding or rewinding the playback of audio clips for the sub-options). As still another example, the electronic device can detect particular inputs for navigating directly to particular sub-options (e.g., detect inputs in Morse code to skip directly to a particular letter or number, for example after enabling Morse-code based inputs).

The electronic device can perform any suitable operation in response to receiving a user selection of a sub-option. In some embodiments, the electronic device can play back audio associated with the selected option (e.g., playback all audio associated with the selected artist, or all of the audio in the selected album or playlist). In some embodiments, the electronic device can provide options for selecting other metadata tags associated with the audio clips related to the selected sub-option. For example, in response to receiving a user selection of an album, the electronic device can provide audio clips associated with playing back the album, the album artist, and titles within the album. As another example, in response to receiving a user selection of an artist, the electronic device can provide audio clips associated with playing back the audio associated with the artist, the albums by the artist, titles of audio by the artist, or playlists having audio by the artist.

In some embodiments, array 500 can include playlist seed option 560. In response to a user selection of playlist seed option 560, the electronic device can play back audio clips associated with information 562 used to identify a playlist seed. For example, the electronic device can play back audio clips for audio titles to serve as seeds directly, or the electronic device can instead or in addition play back audio clips for tags used to classify audio (e.g., artists, titles and genres options). In response to receiving a user selection of a tag sub-option, the electronic device can provide further sub-options for particularly identifying one or more audio items to use as a seed for the seed-based playlist (e.g., sub-options associated with one or more of options 510, 520, 530, 540 and 550).

A user can navigate a multi-dimensional audio menu using any suitable approach. In some embodiments, a user can select an option for which an audio clip is played back. For example, the user can provide an instruction using the input interface (e.g., detected by a sensing element). In response to detecting the instruction, the electronic device can play back audio clips associated with the sub-options of the selected option. The user can then further navigate along the audio menu by continuing to select sub-options to direct the device to play back audio clips associated with further sub-options of the selected sub-option. If an electronic device operation is associated with a selected sub-option (e.g., an instruction to play back audio by a particular user), the electronic device can perform the option in response to receiving an appropriate user selection. The user can in addition navigate up the audio menu (e.g., from a sub-menu to a parent menu) using a different input than the selection input. For example, the user can provide a single input to the sensing element (e.g., a single button press) to provide a selection instruction, and a double input to the sensing element (e.g., a double button press) to navigate up a menu level.

In some embodiments, the audio clips played back by the electronic device can be context-sensitive. For example, the electronic device can identify in the audio clip the current value of a toggled option (e.g., shuffle on or off). As another example, the electronic device can identify the particular selected option to play in an audio clip associated with a play back instruction (e.g., "Play artist Coldplay," "Play title Viva la Vida," or "Play audiobook The Hobbit").

The electronic device can generate the audio clips to play back for the selectable options or sub-options using any suitable approach. In some embodiments, the electronic device can include a text-to-speech engine and sufficient processing to generate the audio clips on the device. Alternatively, the electronic device can receive the audio clips associated with the selectable options from a host device. The host device can generate the audio clips using any suitable approach, including for example using a text-to-speech engine. In some embodiments, the host device can include more substantive processing capabilities than the electronic device, which can allow the host device to generate more polished or accurate audio clips (e.g., audio clips that account for accents or languages). Using a text-to-speech engine can allow the electronic device to generate audio clips for all of the audio menu options (e.g., as opposed to identifying recorded audio clips for menu options, which can not all be available (e.g., no audio clips can be available for less common titles or artist names).

In host device text-to-speech engine embodiments, the host device can identify text strings from which to generate audio clips using any suitable approach. In some embodiments, the host device can identify text strings associated with the electronic device firmware or operating system from the electronic device manufacturer (e.g., as part of a firmware download from the manufacturer when the electronic device firmware is updated). In some embodiments, the electronic device can instead or in addition provide text strings to the host device for synthesizing. For example, the electronic device can provide text strings to the host device as part of a synching protocol when the electronic device is coupled to the host device. In some embodiments, the electronic device can identify the text strings based on the data provided to the electronic device by the host device. For example, the host device can use metadata tags associated with the audio to be transferred to the electronic device as text strings for which to provide audio clips.

Figure 6:
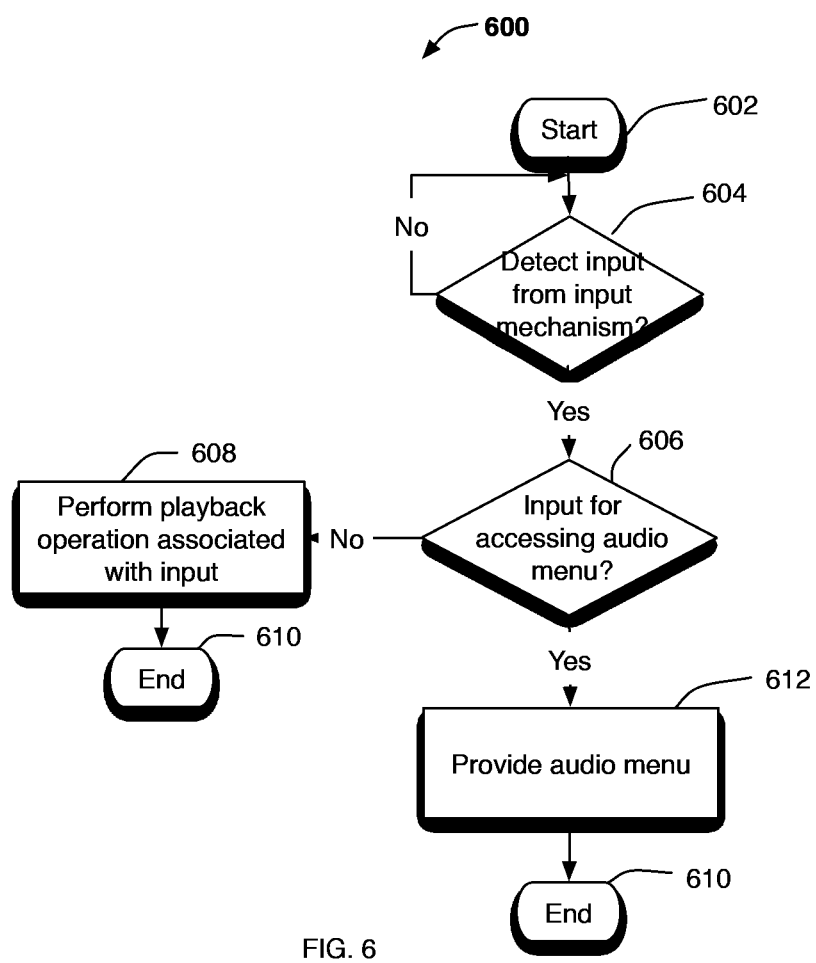
FIG. 6 is a flowchart of an illustrative process for accessing an audio menu in accordance with one embodiment of the invention.

The following flowcharts describe illustrative processes used in connection with the audio user interface of one embodiment of the invention. FIG. 6 is a flowchart of an illustrative process for accessing an audio menu in accordance with one embodiment of the invention. Process 600 can begin at step 602. At step 604, the electronic device can determine whether an input from an input interface was detected. For example, the electronic device can determine whether an input was received from a single sensing element of an input interface coupled to the device. If the electronic device determines that no input was received, process 600 can return to step 604 and continue to monitor for electronic device inputs. If, at step 604, the electronic device instead determines that an input was received, process 600 can move to step 606.

At step 606, the electronic device can determine whether the detected input is associated with accessing an audio menu. For example, the electronic device can determine whether the detected input matches the input associated with accessing an audio menu (e.g., a single elongated press of a button). If the electronic device determines that the detected input is not associated with accessing an audio menu, process 600 can move to step 608. At step 608, the electronic device can perform a playback operation associated with the detected input. For example, the electronic device can determine that all non-audio menu inputs are associated with playback control, and direct the electronic device to perform the playback operation associated with the detected input. Process 600 can then end at step 610.

If, at step 606, the electronic device instead determines that the detected input is associated with providing an audio menu, process 600 can move to step 612. At step 612, the electronic device can provide an audio menu. For example, the electronic device can play back audio clips for several selectable options. Process 600 can then end at step 614.

Figure 7:
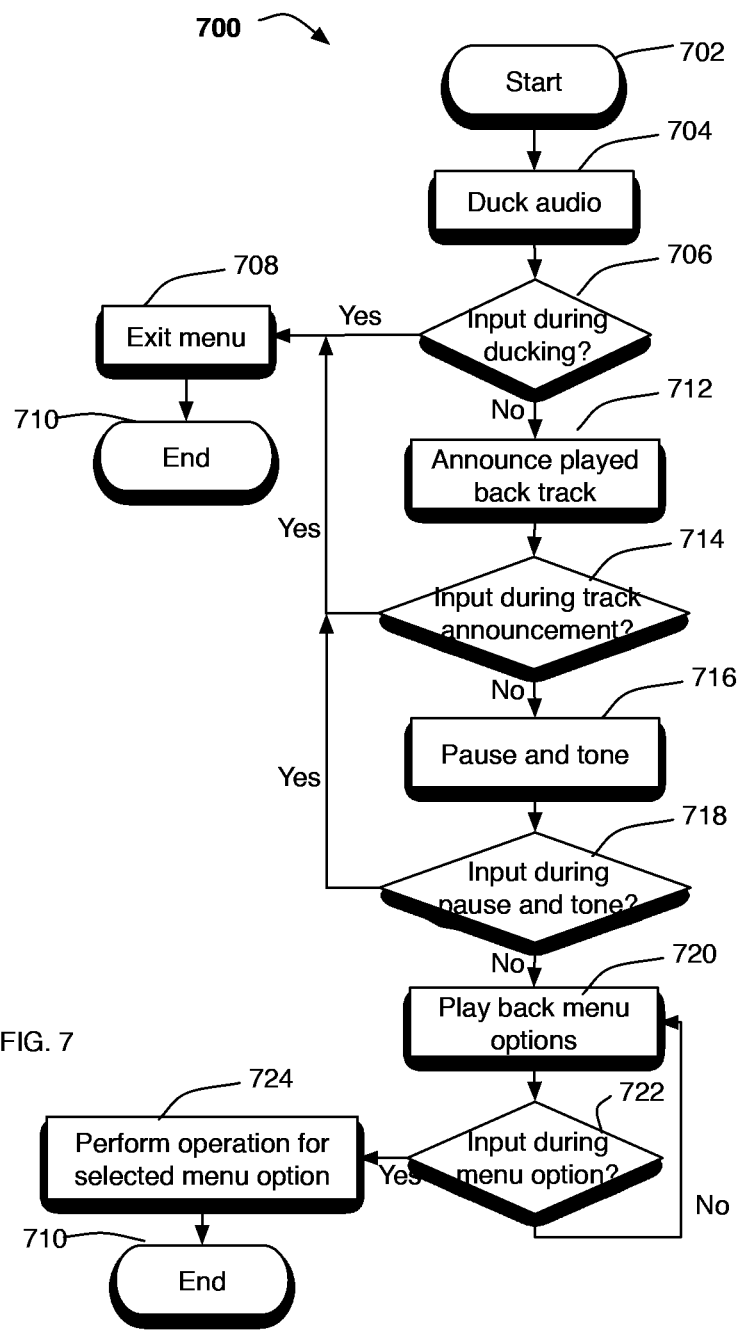
FIG. 7 is a flowchart of an illustrative process for interacting with an audio menu in accordance with one embodiment of the invention.

FIG. 7 is a flowchart of an illustrative process for interacting with an audio menu in accordance with one embodiment of the invention. Process 700 can begin at step 702. At step 704, the electronic device can duck currently played back audio. For example, the electronic device can decrease the volume of the audio to a particular level. The particular level can be determined based on the volume value, a measurement of the music energy, the decibel output of the audio, or any other suitable measure. At step 706, the electronic device can determine whether an input was received during ducking. For example, the electronic device can determine whether an input was received from the input interface (e.g., an input detected from a single sensing element) used to access or enable the audio menu mode. If the electronic device determines an input was received, process 700 can move to step 708.

At step 708, the electronic device can exit the audio menu. For example, the electronic device can cease the audio menu playback (e.g., cease ducking, track announcement, or playing back menu options) and return to the playback of the previous audio. In some embodiments, the electronic device can increase the electronic device volume to the volume level before enabling the audio menu. Process 700 can then end at step 710.

If, at step 706, the electronic device instead determines that no input was received during ducking, process 700 can move to step 712. At step 712, the electronic device can announce the played back track prior to enabling the audio menu. For example, the electronic device can identify an audio clip associated with metadata of the played back audio (e.g., an audio clip for the audio title and artist). At step 714, the electronic device can determine whether an input was received during the track announcement. For example, the electronic device can determine whether an input was received from the input interface used to access or enable the audio menu mode. If the electronic device determines an input was received, process 700 can move to step 708, described above. If, at step 714 the electronic device instead determines that no input was received during the track announcement, process 700 can move to step 716.

At step 716, the electronic device can pause (e.g., leave a moment of silence to allow the user to register the track announcement and decide whether or not to exit the audio menu mode) and provide an audio tone to indicate that menu options will be provided. For example, the electronic device can pause for a predetermined duration (e.g., 500 ms) and provide an audio tone following the pause. At step 718, the electronic device can determine whether an input was received during the pause and the provided audio tone. For example, the electronic device can determine whether an input was received from the input interface used to access or enable the audio menu mode. If the electronic device determines an input was received, process 700 can move to step 708, described above. If, at step 718 the electronic device instead determines that no input was received during the pause and audio tone, process 700 can move to step 720.

At step 720, the electronic device can play back menu options associated with an audio menu. For example, the electronic device can play back consecutive audio clips associated with menu options playback. At step 722, the electronic device can determine whether an input was received during the menu option. For example, the electronic device can determine whether an input to select an audio mode option was received from the input interface. If the electronic device determines that no input was received, process 700 can return to step 720 and continue to play back audio clips for audio menu options. If, at step 722, the electronic device instead determines that an input was received, process 700 can move to step 724. At step 724, the electronic device can perform an operation associated with the menu option selected by the detected user input. For example, the electronic device can play back audio associated with a selected option. Process 700 can then end at step 710.

Figure 8:
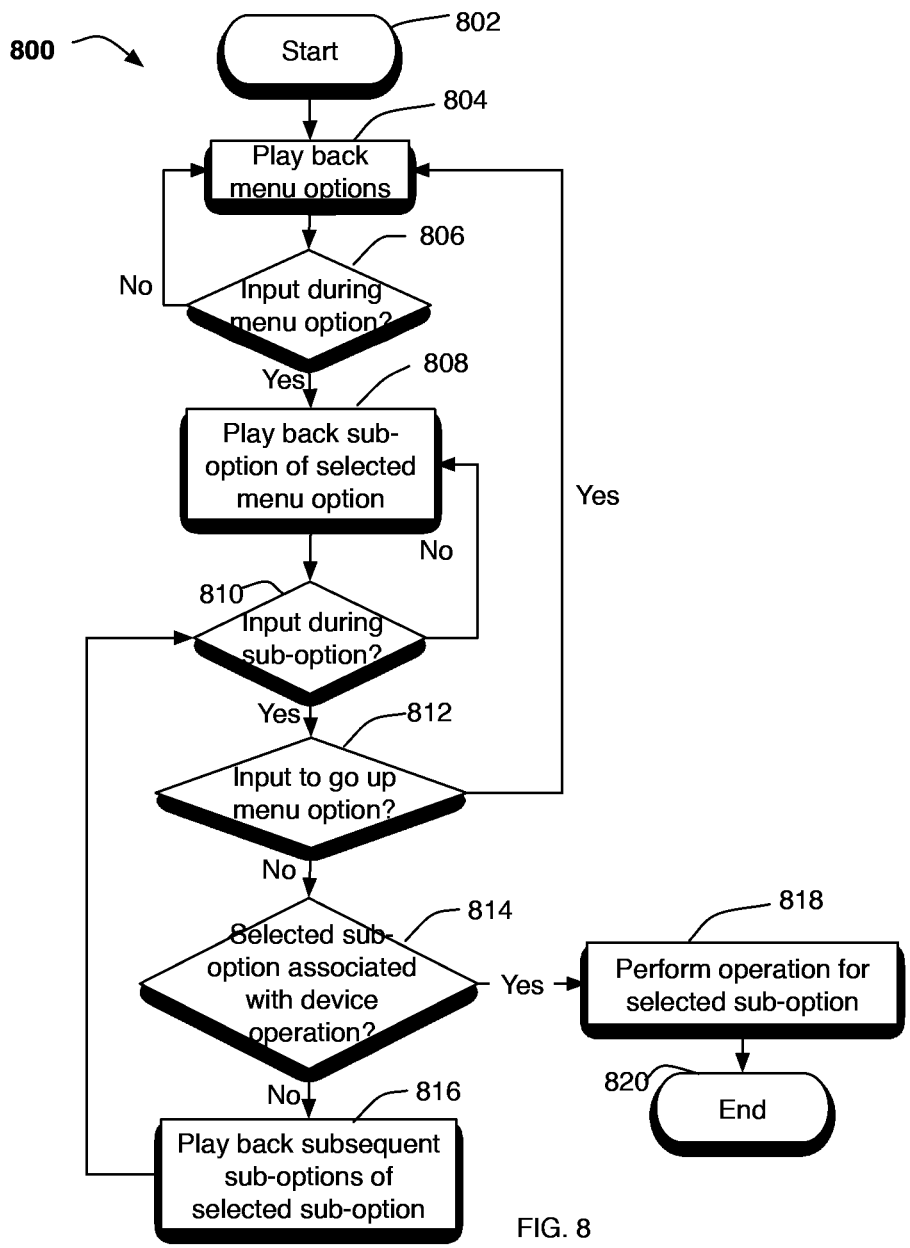
FIG. 8 is a flowchart of an illustrative process for interacting with a multi-dimensional menu in accordance with one embodiment of the invention.

FIG. 8 is a flowchart of an illustrative process for interacting with a multi-dimensional menu in accordance with one embodiment of the invention. Process 800 can begin at step 802. At step 804, the electronic device can play back menu options associated with an audio menu. For example, the electronic device can play back consecutive audio clips associated with menu options. At step 806, the electronic device can determine whether an input was received during the playback of an audio clip associated with a menu option. For example, the electronic device can determine whether an input was received to select one of the options for which an audio clip was played back. If the electronic device determines that no input was received, process 800 can return to step 804 and continue to play back audio clips for audio menu options. If, at step 806, the electronic device instead determines that an input was received, process 800 can move to step 808. At step 808, the electronic device can play back audio clips for sub-options associated with the selected option. For example, the electronic device can play back audio clips for artist names in response to receiving an input selecting an artist option.

At step 810, the electronic device can determine whether an input was received during the playback of an audio clip associated with a sub-option. For example, the electronic device can determine whether an input was received to select one of the sub-options for which an audio clip was played back. If the electronic device determines that no input was received, process 800 can return to step 808 and continue to play back audio clips for audio menu sub-options. If, at step 810, the electronic device instead determines that an input was received, process 800 can move to step 812.

At step 812, the electronic device can determine whether the input detected at step 810 was an input associated with an instruction to go up a menu level. For example, the electronic device can determine whether the input was associated with a "back" instruction (e.g., an elongated press of a button). If the electronic device determines that the detected input is associated with an instruction to go up a menu level, process 800 can move to back to step 804 and play back audio clips for menu options one level up from the sub-option level of step 808. If, at step 812, the electronic device instead determines that the input detected was not an input associated with an instruction to go up a menu level, process 800 can move to step 814. At step 814, the electronic device can determine whether the input detected at step 810 was an input for a sub-option associated with an electronic device operation. For example, the electronic device can determine whether the input was associated with a selection instruction (e.g., a single press of a button) for a sub-option option associated with an electronic device operation. If the electronic device determines that the detected input is not associated an electronic device operation (e.g., the sub-option selected is not associated with an electronic device operation), process 800 can move to step 816. At step 816, the electronic device can play back audio clips for subsequent sub-options associated with the selected sub-option. For example, the electronic device can identify subsequent sub-options for the selected sub-option, and play back audio clips associated with the identified subsequent sub-options. Process 800 can then return to step 810 and monitor for inputs during the playback of the audio clips.

If at step 814, the electronic device instead determines that the input detected was an input for a sub-option associated with an electronic device operation (e.g., the selected sub-option is associated with an electronic device operation), process 800 can move to step 818. At step 818, the electronic device can perform an electronic device operation associated with the selected sub-option. For example, the electronic device can play back audio identified by the sub-option (e.g., audio by the selected artist name sub-option). Process 800 can then end at step 820.

The above-described embodiments of the present invention are presented for purposes of illustration and not of limitation, and the present invention is limited only by the claims which follow.

What is claimed is:

1. A method for controlling an electronic device using a single sensing element, comprising:
   playing back with the electronic device a first audio clip in a first manner;
   during the playing back in the first manner:
      detecting with the single sensing element a first user input;
      in response to the detecting the first user input, altering with the electronic device the playing back from the first manner to a second manner; and
      in response to the altering, playing back with the electronic device the first audio clip in the second manner;
   during the playing back the first audio clip in the second manner, playing back with the electronic device a second audio clip to announce the first audio clip; and
   after the playing back the second audio clip, playing back with the electronic device a first menu audio clip that is associated with a menu of the electronic device.

2. The method of claim 1, wherein a first menu option is associated with each of the first menu audio clip that is played back and an electronic device operation, the method further comprising:
   detecting with the single sensing element a second user input; and
   in response to the detecting the second user input, accessing with the electronic device the first menu option.

3. The method of claim 1, wherein the second audio clip that is played back corresponds to at least one of a title, an artist, an album name, an audiobook title, a chapter name, a genre, and a year that is associated with the first audio clip that is played back.

4. The method of claim 1, further comprising:
   after the detecting the first user input, entering with the electronic device a menu mode of the electronic device; and
   at least one of during the playing back the first audio clip in the second manner and after the playing back the first audio clip in the second manner:
      detecting with the single sensing element a second user input; and
      exiting with the electronic device the entered menu mode in response to the detecting the second user input.

5. The method of claim 4, wherein the detected first user input comprises a single press and hold of the single sensing element, and wherein the detected second user input comprises a release of the pressed and held single sensing element.

6. The method of claim 4, wherein each of the detected first user input and the detected second user input comprises a single elongated press of the single sensing element.

7. The method of claim 1, further comprising:
  detecting with the single sensing element a second user input during the playing back the first menu audio clip; and
  in response to the detecting the second user input, skipping the playing back the first menu audio clip to play back a second menu audio clip.

8. The method of claim 1, wherein the single sensing element comprises at least one of a mechanical sensor, a resistive sensor, and a capacitive sensor.

9. The method of claim 1, wherein the altering the playing back to the second manner comprises ducking the first audio clip that is played back in the first manner.

10. The method of claim 9, wherein the ducking comprises reducing a volume of the playing back the first audio clip in the first manner.

11. The method of claim 10, wherein the reducing the volume comprises adjusting the volume to a predefined volume level that is audible.

12. The method of claim 1, wherein the playing back the first audio clip in the second manner comprises playing back the first audio clip at a first volume level, and wherein the playing back the second audio clip comprises playing back the second audio clip at a second volume level that is higher than the first volume level.

13. The method of claim 1, wherein the detected first user input comprises a single extended press of the single sensing element.

14. The method of claim 1, wherein the second audio clip that is played back corresponds to metadata that is associated with the first audio clip that is played back.

15. The method of claim 1 further comprising, after the playing back the second audio clip, but before the playing back the first menu audio clip:
  playing back a third audio clip to indicate an end of the announcing of the first audio clip.

16. The method of claim 15, wherein the third audio clip that is played back comprises at least one of a tone and a beep.

17. The method of claim 1, wherein the first menu audio clip that is played back is associated with a first menu option of the menu.

18. The method of claim 17 further comprising, during the playing back the first menu audio clip:
  detecting with the single sensing element a second user input; and
  in response to the detecting the second user input, accessing with the electronic device the first menu option.

19. The method of claim 1, wherein, after the detecting the first user input, but before the playing back the first menu audio clip:
  accessing with the electronic device a menu mode of the electronic device; and
  after the accessing, identifying with the electronic device at least the first menu audio clip.

20. An electronic device for providing an audio menu to a user, comprising:
  a single sensing element for detecting user inputs;
  an audio output; and
  a processor operative to:
    direct the audio output to play back a first audio clip in a first manner;
    during the playback of the first audio clip in the first manner, receive from the single sensing element a first user input that is detected by the single sensing element;
    in response to the receiving the first user input, direct the audio output to alter the playback from the first manner to a second manner;
    during the playback of the first audio clip in the second manner, direct the audio output to play back a second audio clip to announce the first audio clip; and
    after the playback of the second audio clip, direct the audio output to play back a first menu audio clip that is associated with the audio menu.

21. The electronic device of claim 20, wherein the processor is further operative to
  direct the audio output to alter the playback to the second manner by directing the audio output to duck the first audio clip that is being played back in the first manner.

22. The electronic device of claim 21, wherein the audio output ducks the first audio clip by reducing a volume of the playback of the first audio clip in the first manner.

23. The electronic device of claim 22, wherein the reducing the volume comprises reducing the volume to a predefined volume level that is audible.

24. The electronic device of claim 22, wherein the volume is reduced over a duration in the range of 50 ms to 800 ms.

25. The electronic device of claim 20, wherein:
  the single sensing element comprises a mechanical sensor;
  the detected first user input comprises an elongated press of the mechanical sensor; and
  the detected second user input comprises a subsequent press of the mechanical sensor.

26. The electronic device of claim 20, wherein:
  the single sensing element comprises a mechanical sensor;
  the detected first user input comprises a press and hold of the mechanical sensor; and
  the detected second user input comprises a release of the mechanical sensor.

27. The electronic device of claim 20, wherein the processor is further operative to:
  during the playback of the first menu audio clip, receive a second user input from the single sensing element that is detected by the single sensing element; and
  after the receiving the detected second user input, direct the audio output to play back a second menu audio clip that is associated with the audio menu.

28. The electronic device of claim 20, wherein the audio output is coupled to at least one of an earbud, headphones, and a speaker.

29. The electronic device of claim 20, wherein the audio output is operative to play back the first audio clip in the second manner by playing back the first audio clip at a first volume level, and wherein the audio output is operative to play back the second audio clip by playing back the second audio clip at a second volume level that is higher than the first volume level.

30. The electronic device of claim 20, wherein the second audio clip that is played back corresponds to metadata that is associated with the first audio clip.

31. The electronic device of claim 20, wherein the processor is further operative to, after the directing the audio output to play back the second audio clip, but before the directing the audio output to play back the first menu audio clip:
  direct the audio output to play back a third audio clip to indicate an end of the announcing of the first audio clip.

32. The electronic device of claim 31, wherein the third audio clip that is played back comprises at least one of a tone and a beep.

33. The electronic device of claim 20, wherein the first menu audio clip that is played back is associated with a first menu option of the menu.

34. The electronic device of claim 33, wherein the processor is further operative to, while the audio output is playing back the first menu audio clip:
  receive from the single sensing element a second user input that is detected by the single sensing element; and
  in response to the receiving the second user input, access the first menu option.

35. The electronic device of claim 20, wherein the processor is further operative to, after the receiving the first user input, but before the directing the audio output to play back the first menu audio clip:
  access the audio menu of the electronic device; and
  after the accessing, identify at least the first menu audio clip.

36. The electronic device of claim 20, wherein the electronic device does not comprise a display.

37. The electronic device of claim 20, wherein the single sensing element is the only user input interface of the electronic device.

38. A non-transitory computer-readable media for controlling an electronic device using a single input interface, the non-transitory computer-readable media comprising computer-readable instructions for:
  directing an audio output of the electronic device to play back a first audio clip in a first manner;
  during the playback of the first audio clip in the first manner, receiving a first user input from the single input interface;
  in response to the receiving, directing the audio output to alter the playback from the first manner to a second manner;
  during the playback of the first audio clip in the second manner, directing the audio output to play back a second audio clip to announce the first audio clip; and
  after the playback of the second audio clip, directing the audio output to play back a first menu audio clip that is associated with an audio menu of the electronic device.

* * * * *